(12) United States Patent
Motoi et al.

(10) Patent No.: US 11,001,092 B2
(45) Date of Patent: May 11, 2021

(54) INFORMATION PAGE

(71) Applicant: Dai Nippon Printing Co., Ltd., Tokyo (JP)

(72) Inventors: Takumi Motoi, Tokyo (JP); Shuhei Urata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/485,963

(22) PCT Filed: Feb. 15, 2018

(86) PCT No.: PCT/JP2018/005351
§ 371 (c)(1),
(2) Date: Aug. 14, 2019

(87) PCT Pub. No.: WO2018/151238
PCT Pub. Date: Aug. 23, 2018

(65) Prior Publication Data
US 2020/0062019 A1    Feb. 27, 2020

(30) Foreign Application Priority Data
Feb. 16, 2017    (JP) .............. JP2017-027038

(51) Int. Cl.
*G06K 19/06*    (2006.01)
*G06K 19/077*   (2006.01)
(Continued)

(52) U.S. Cl.
CPC ............. *B42D 25/22* (2014.10); *B42D 25/24* (2014.10); *B42D 25/29* (2014.10); *B42D 25/305* (2014.10);
(Continued)

(58) Field of Classification Search
CPC ................ G06K 19/063; G06K 19/08; G06K 19/06009; G06K 19/025; G06K 19/06; G06K 19/077; B42D 25/328
See application file for complete search history.

(56) References Cited

U.S. PATENT DOCUMENTS 6,213,702 B1 *   4/2001   Wesselink ............. B42D 25/40
                                                 281/21.1
8,608,080 B2 *  12/2013   Finn .................... H01L 42/85
                                                 235/492

(Continued)

FOREIGN PATENT DOCUMENTS

DE    102004055495 A1   5/2006
JP    2000-168278 A     6/2000
(Continued)

OTHER PUBLICATIONS

International Search Report dated Apr. 17, 2018, issued for PCT/JP2018/005351.

(Continued)

*Primary Examiner* — Daniel I Walsh
(74) *Attorney, Agent, or Firm* — Locke Lord LLP

(57) ABSTRACT

There is provided an information page of a security document in which no non-uniform external force acts on an IC module. The information page of a security document includes a core layer, an IC module holding layer provided on one surface of the core layer via an intermediate layer, an IC module held in the IC module holding layer, and a laser printing layer provided on the other surface of the core layer. The intermediate layer and the IC module holding layer are both made of polycarbonate.

20 Claims, 6 Drawing Sheets

(51) Int. Cl.
  *B42D 25/22* (2014.01)
  *B42D 25/24* (2014.01)
  *B42D 25/29* (2014.01)
  *B42D 25/305* (2014.01)
  *B42D 25/328* (2014.01)
  *B42D 25/351* (2014.01)
  *B42D 25/41* (2014.01)
  *B42D 25/45* (2014.01)

(52) U.S. Cl.
  CPC ......... *B42D 25/328* (2014.10); *B42D 25/351* (2014.10); *B42D 25/41* (2014.10); *B42D 25/45* (2014.10); *G06K 19/06009* (2013.01); *G06K 19/0772* (2013.01)

(56) References Cited

U.S. PATENT DOCUMENTS

| | | | | |
|---|---|---|---|---|
| 8,640,961 | B2* | 2/2014 | Gruenauer | B42D 25/47 235/488 |
| 8,680,007 | B2 | 3/2014 | Tatewaki et al. | |
| 9,962,988 | B2* | 5/2018 | Springmann | B42D 1/007 |
| 2005/0202249 | A1* | 9/2005 | Iliescu | B32B 27/365 428/412 |
| 2005/0242194 | A1* | 11/2005 | Jones | B42D 25/455 235/487 |
| 2006/0261171 | A1* | 11/2006 | Buursma | B42D 25/435 235/487 |
| 2006/0262367 | A1* | 11/2006 | Hattori | B41M 3/14 359/15 |
| 2006/0275671 | A1* | 12/2006 | Eto | G03H 1/0248 430/1 |
| 2007/0195392 | A1* | 8/2007 | Phillips | B42D 25/29 359/15 |
| 2007/0257797 | A1* | 11/2007 | Rancien | B42D 25/305 340/572.1 |
| 2008/0001844 | A1* | 1/2008 | Sabbah | G06K 19/025 343/873 |
| 2008/0169901 | A1* | 7/2008 | Timm | G06K 19/07749 340/5.81 |
| 2008/0179404 | A1* | 7/2008 | Finn | H01Q 1/2225 235/492 |
| 2008/0308641 | A1* | 12/2008 | Finn | G06K 19/07749 235/492 |
| 2008/0309064 | A1 | 12/2008 | Herlin et al. | |
| 2009/0047450 | A1* | 2/2009 | Riedl | B42D 25/00 428/32.39 |
| 2009/0097944 | A1* | 4/2009 | van den Berg | B42D 25/24 412/4 |
| 2009/0170699 | A1 | 7/2009 | Tatewaki et al. | |
| 2009/0294534 | A1* | 12/2009 | Pepori | G06K 19/073 235/439 |
| 2010/0025481 | A1* | 2/2010 | Brod | G06K 19/07749 235/492 |
| 2010/0291392 | A1* | 11/2010 | Leopold | B32B 27/08 428/412 |
| 2010/0295290 | A1* | 11/2010 | Muth | B32B 27/20 283/109 |
| 2010/0295291 | A1* | 11/2010 | Rancien | B42D 25/29 283/113 |
| 2010/0304093 | A1* | 12/2010 | Hagemann | B42D 25/41 428/172 |
| 2010/0310812 | A1* | 12/2010 | Muth | B32B 37/142 428/76 |
| 2011/0223394 | A1* | 9/2011 | Daigaku | C09J 7/385 428/195.1 |
| 2012/0040128 | A1* | 2/2012 | Finn | H01Q 7/00 428/96 |
| 2012/0104102 | A1* | 5/2012 | Rancien | B41M 3/10 235/488 |
| 2012/0164419 | A1* | 6/2012 | Sakagami | B32B 27/12 428/216 |
| 2013/0062875 | A1* | 3/2013 | Le Loarer | B42D 15/00 283/83 |
| 2013/0214524 | A1* | 8/2013 | Hagemann | B42D 25/23 283/72 |
| 2013/0233928 | A1* | 9/2013 | Ghisa | B42D 25/46 235/488 |
| 2013/0344298 | A1* | 12/2013 | Haas | B42D 25/328 428/195.1 |
| 2014/0131989 | A1* | 5/2014 | Pohjola | B42D 25/45 283/85 |
| 2014/0193615 | A1* | 7/2014 | Ritter | B32B 41/00 428/198 |
| 2014/0197626 | A1* | 7/2014 | Le Loarer | B42D 25/29 283/85 |
| 2014/0265295 | A1* | 9/2014 | Rhyner | B42D 25/324 281/38 |
| 2014/0265301 | A1* | 9/2014 | Haas | B42D 25/373 283/85 |
| 2015/0129780 | A1* | 5/2015 | Le Loarer | B42D 25/45 250/459.1 |
| 2015/0191037 | A1* | 7/2015 | Hagemann | B32B 27/00 427/8 |
| 2015/0227829 | A1* | 8/2015 | Finn | G06K 19/0775 235/488 |
| 2015/0298389 | A1* | 10/2015 | Richoz | G06K 7/10316 438/64 |
| 2016/0355045 | A1* | 12/2016 | Ivester | B42D 13/00 |
| 2018/0065397 | A1* | 3/2018 | Noizet | B41M 5/267 |
| 2018/0074352 | A1* | 3/2018 | Popovich | G02F 1/1326 |
| 2018/0290478 | A1* | 10/2018 | Sugdon | B42D 25/351 |
| 2018/0290481 | A1* | 10/2018 | Sugdon | B42D 25/455 |
| 2019/0092080 | A1* | 3/2019 | Sugdon | B42D 25/328 |
| 2019/0126661 | A1* | 5/2019 | Erickson | B42D 25/351 |
| 2019/0152252 | A1* | 5/2019 | Thurailingam | B42D 25/455 |
| 2019/0210396 | A1* | 7/2019 | Peters | B42D 25/373 |
| 2019/0240886 | A1* | 8/2019 | van Peer | B32B 27/288 |
| 2019/0256706 | A1* | 8/2019 | Takeda | C08L 67/04 |
| 2020/0016877 | A1* | 1/2020 | Suzuki | B32B 27/08 |
| 2020/0039278 | A1* | 2/2020 | Endres | B42D 25/455 |
| 2020/0062019 | A1* | 2/2020 | Motoi | B42D 25/22 |
| 2020/0215841 | A1* | 7/2020 | Ederer | B42D 25/425 |
| 2020/0247170 | A1* | 8/2020 | Sugdon | B42D 25/29 |

FOREIGN PATENT DOCUMENTS

| | | |
|---|---|---|
| JP | 3100854 U | 5/2004 |
| JP | 2006-123382 A | 5/2006 |
| JP | 2006-163701 A | 6/2006 |
| JP | 2006-309603 A | 11/2006 |
| JP | 2009-514708 A | 4/2009 |
| JP | 2009-173013 A | 8/2009 |
| WO | 2004/074000 A1 | 9/2004 |

OTHER PUBLICATIONS

"Journal of Documents & Identity" P31, published 2009, No. 30, published by Keesing (4 pages). (cited in the Nov. 8, 2019 JP Information Offer Form for JP2018-568617).

Information Offer Form dated Nov. 8, 2019, issued for Japanese Patent Application No. 2018-568617 and English translation thereof.

Translation of International Preliminary Report of Patentability dated Aug. 22, 2019, issued for PCT/JP2018/005351.

Supplementary European Search Report dated Aug. 7, 2020, issued for European Patent Application No. 18754935.7.

\* cited by examiner

INFORMATION PAGE

TECHNICAL FIELD

The present invention relates to an information page of a security document having an IC module, such as a passport, and more particularly to an information page of a security document which can prevent deformation of an IC module.

BACKGROUND ART

A security document such as a passport contains an information page with a built-in IC module.

In general, an information page with a built-in IC module has a multi-layer structure including a plurality of layers, in which the IC module is incorporated.

Such an information page can be obtained by preparing a multi-layer structure comprised of a laminate of layers, in which an IC module is interposed, and subjecting the multi-layer structure to hot pressing.

However, it is possible that upon the hot pressing of the multi-layer structure, a non-uniform external force may be applied to the IC module due to differences in thermal shrinkage rate between the layers, resulting in deformation of the IC module.

Such deformation of the IC module, caused by the application of a non-uniform external force thereto, can affect the performance of the IC module and, in addition, is undesirable in terms of appearance.

CITATION LIST

Patent Literature

Patent document 1: Published Japanese Translation No. 2009-514708 of the PCT International Publication

SUMMARY OF THE INVENTION

Problems to be Solved by the Invention

The present invention has been made in view of the above situation. It is therefore an object of the present invention to provide an information page of a security document in which no non-uniform external force acts on an IC module, and there is no occurrence of deformation of the IC module.

Means for Solving the Problems

The present invention provides an information page of a security document, comprising: a core layer having flexibility for incorporating the information page into the security document; an IC module holding layer provided on one surface of the core layer via an intermediate layer; and an IC module held in the IC module holding layer and including a substrate, and an IC chip provided on the substrate, wherein the intermediate layer and the IC module holding layer are both made of polycarbonate.

In a preferred embodiment of the present invention, the information page further comprises a laser printing layer provided on the other surface of the core layer.

In a preferred embodiment of the present invention, the IC module holding layer has a multi-layer construction including a substrate accommodating layer accommodating the substrate, and an IC chip accommodating layer accommodating the IC chip, and an antenna, connected to the IC chip of the IC module, is interposed between the substrate accommodating layer and the IC chip accommodating layer.

In a preferred embodiment of the present invention, a hologram is interposed between any two layers of the information page.

In a preferred embodiment of the present invention, the information page further comprises a first external transparent layer provided on the laser printing layer and having print formed on its inner surface.

In a preferred embodiment of the present invention, the information page further comprises a second external transparent layer provided on the IC module holding layer and having print formed on its inner surface.

In a preferred embodiment of the present invention, the information page further comprises a first white layer provided between the core layer and the laser printing layer and having print formed on its outer surface.

In a preferred embodiment of the present invention, the information page further comprises a first external transparent layer provided on the laser printing layer.

In a preferred embodiment of the present invention, the information page further comprises a second white layer provided on the IC module holding layer and having print formed on its outer surface.

In a preferred embodiment of the present invention, the information page further comprises a transparent window made of a transparent material and penetrating at least the core layer and the IC module holding layer.

The present invention also provides a security document incorporating any one of the above-described information pages.

Advantageous Effects of the Invention

According to the present invention, no non-uniform external force acts on an IC module upon hot pressing, and therefore there is no occurrence of deformation of the IC module.

DESCRIPTION OF THE EMBODIMENTS

First Embodiment

An information page of a security document according to a first embodiment will now be described in detail with reference to FIGS. 1 through 5 and some specific examples.

At the outset, the security document incorporating the information page according to the first embodiment will now be described with reference to FIGS. 4 and 5.

Figure 4:
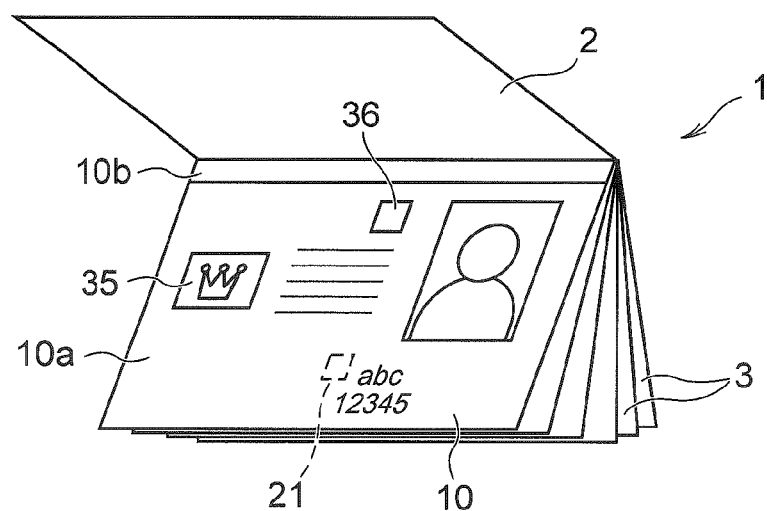
FIG. 4 is a perspective view of a security document.
Figure 5:
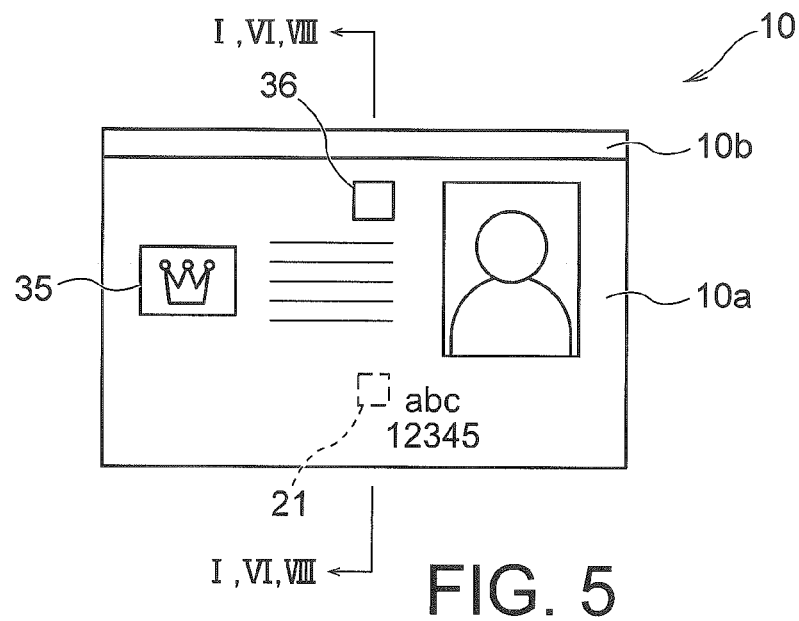
FIG. 5 is a plan view of the information page.

The security document 1 shown in FIGS. 4 and 5 includes a passport, etc., and contains the information page 10. The information page 10 is attached, in a connecting portion 10b, to a cover 2 and other pages 3 of the security document e.g. by sewing.

The information page 10 includes an information portion 10a, and the connecting portion 10b for attachment to the cover 2 and to the other pages 3.

The information portion 10a of the information page 10 contains personal information such as the name, the date of birth, a photograph, etc. of a passport holder. Part of the information is printed by using, for example, the below-described laser light technique.

As shown in FIG. 5, the connecting portion 10b of the information page 10 is composed of a core layer 11 having a net-like structure. The core layer 11 will be described below in greater detail. The net-like structure of the connecting portion 10b is formed of a fabric of crossing yarns each composed of a plurality of single fibers.

Alternatively, the net-like structure may be provided by a method which involves perforating a uniform film to create a desired pattern. What is essential to the present invention is that the net has a sufficient number of "yarns", and that it is quite difficult to attach the yarns to each other without leaving a visible trace associated with attempted counterfeiting.

The core layer 11 of the connecting portion 10b extends into the information portion 10a.

The information page 10 of the security document will now be further described with reference to FIGS. 1 through 3. As described above, the information page 10 includes the information portion 10a and the connecting portion 10b, and is attached, in the connecting portion 10b, to the cover 2 and the other pages 3 of the security document 1, thus constituting the security document 1.

The information page 10 includes the core layer 11 having flexibility and having a net-like structure, an IC module holding layer 12 provided on the lower surface (one surface) of the core layer 11 via an intermediate layer 13, an IC module 20 held in the IC module holding layer 12, and a laser printing layer 15 provided on the upper surface (the other surface) of the core layer 11 via a first white layer 23.

The core layer 11 having a net-like structure includes a body portion 11a which is bonded to the IC module holding layer 12, the laser printing layer 15, etc. and which, together with them, constitutes the information portion 10a, and a connecting portion 11b constituting the connecting portion 10b which is composed solely of the core layer 11 and in which the information page 10 is attached to the cover 2 and the other pages 3.

The IC module 20 includes a substrate 21, and an IC chip 22a provided on the substrate 21 and covered with a sealing resin 22b. The IC chip 22a and the sealing resin 22b constitute an IC chip body 22 (see FIG. 2). In the illustrated case, the thickness of the IC chip body 22 is larger than the thickness of the substrate 21. For example, the thickness of the IC chip body 22 is 50 µm to 220 µm, while the thickness of the substrate 21 is 50 µm to 100 µm. By making the thickness of the IC chip body 22 larger than the thickness of the substrate 21, deformation of the entire IC module 20 can be reduced.

The IC module 20 having the above construction is held in the IC module holding layer 12. In the illustrated case, the IC module holding layer 12 includes a substrate accommodating layer 12a accommodating the substrate 21 of the IC module 20 and housing the substrate 21, and an IC chip body accommodating layer (also referred to as an IC chip accommodating layer) 12b accommodating the IC chip body 22 containing the IC chip 22a, and housing the IC chip body 22.

An antenna 25, connected to the IC chip 22a of the IC module 20, is disposed between the substrate accommodating layer 12a and the IC chip accommodating layer 12b of the IC module holding layer 12. The antenna 25 is made of copper, and is interposed between the substrate accommodating layer 12a and the IC chip accommodating layer 12b (see FIGS. 1 and 3).

The IC module holding layer 12 has an IC module housing space 40 in which the IC module 20 is housed and which is composed of an opening 38 formed in the substrate accommodating layer 12a, and an opening 39 formed in the IC chip accommodating layer 12b. The IC module housing space 40 is closed from above and below with the intermediate layer 13 and with an additional intermediate layer 14 provided on the lower surface of the IC module holding layer 12.

The laser printing layer 15 is blackened by irradiation with laser light so that a desired character can be displayed. To this end, the laser printing layer 15 is formed of polycarbonate containing a laser coloring accelerator and, when irradiated with laser light, the laser coloring accelerator has heat energy. The heat energy chars and blackens carbon contained in the polycarbonate in contact with the laser coloring accelerator, resulting in display of a character.

A first external transparent layer 17 is provided on the upper surface of the laser printing layer 15, and a volume hologram 35 is interposed between the laser printing layer 15 and the first external transparent layer 17. The volume hologram 35 can display, for example, a crown in the information page 10 (see FIGS. 4 and 5).

Print 30, such as characters, a pattern, etc., has been formed on the lower surface (inner surface) of the first external transparent layer 17.

The print 30, such as characters, a pattern, etc., includes information displayed on the front surface of the information page 10 of the security document. Such information includes, for example, general information other than individual information such as name and address. The individual information such as name and address is formed by irradiating the laser printing layer 15 with laser light.

A second external transparent layer 18 is provided on the lower surface of the additional intermediate layer 14. Print 30, such as characters, a pattern, etc., has been formed also on the upper surface (inner surface) of the second external transparent layer 18.

The first white layer 23 functions to enhance visibility of the print 30, which has been formed on the lower surface of the first external transparent layer 17, when viewing the print 30 from the side of the first external transparent layer 17.

In particular, with the first white layer 23 provided under the first external transparent layer 17, the first white layer 23 serves as a background and enables the print 30, which is colored dark and formed on the lower surface of the first external transparent layer 17, to be easily viewed (checked) from the side of the first external transparent layer 17.

There is also provided a transparent window 36 made of a transparent material and penetrating the first white layer 23, the core layer 11, the intermediate layer 13, the IC module holding layer 12 and the additional intermediate layer 14.

The materials of the respective layers constituting the information page 10 will now be described. At the outset, the core layer 11 having a net-like structure is made of PET, nylon, or the like.

The intermediate layer 13, the first external transparent layer 17 and the second external transparent layer 18 are all made of transparent polycarbonate.

The substrate accommodating layer 12a and the IC chip accommodating layer 12b of the IC module holding layer 12, the first white layer 23 and the additional intermediate layer 14 are all made of white polycarbonate.

The laser printing layer 15 is made of polycarbonate containing a laser coloring accelerator.

A method for producing the thus-constructed information page 10 of the security document will now be described.

First, the intermediate layer 13 and the substrate accommodating layer 12a of the IC module holding layer 12 are laminated together. Subsequently, the substrate 21 of the preformed IC module 20 is inserted into the opening 38 of the substrate accommodating layer 12a. Subsequently, the antenna 25 is disposed on the substrate accommodating layer 12a, and connected to the IC chip 22a of the IC module 20.

Thereafter, the IC chip accommodating layer 12b is laminated to the substrate accommodating layer 12a. The lamination of the IC chip accommodating layer 12b to the substrate accommodating layer 12a is performed such that the IC chip body 22 of the IC module 20 is housed in the opening 39 of the IC chip accommodating layer 12b. Subsequently, the additional intermediate layer 14 is laminated to the IC chip accommodating layer 12b.

Thereafter, the laminate consisting of the intermediate layer 13, the substrate accommodating layer 12a and the IC chip accommodating layer 12b of the IC module holding layer 12, and the additional intermediate layer 14 is subjected to hot pressing to heat and press the laminate, thereby bonding the layers of the laminate together.

The IC module housing space 40 in which the IC module 20 is housed is surrounded by the intermediate layer 13, the substrate accommodating layer 12a, the IC chip accommodating layer 12b and the additional intermediate layer 14 which are all made of polycarbonate. Thus, the IC module housing space 40 is surrounded by the polycarbonate materials having approximately the same thermal shrinkage rate. Accordingly, the IC module housing space 40 contracts uniformly with good balance during the hot pressing; therefore, no non-uniform external force will be applied by the interior walls of the IC module housing space 40 to the IC module 20 housed in the IC module housing space 40, resulting in no deformation of the IC module 20. This makes it possible to maintain the performance and the appearance of the IC module 20.

Next, the core layer 11 and the first white layer 23 are laminated to the laminate consisting of the intermediate layer 13, the IC module holding layer 12 and the additional intermediate layer 14, and then the laser printing layer 15 is laminated to the first white layer 23.

Thereafter, the volume hologram 35 is provided on the laser printing layer 15, and then the first external transparent layer 17, having the print 30 on the inner surface, is laminated to the laser printing layer 15. Subsequently, the second external transparent layer 18, having the print 30 on the inner surface, is laminated to the additional intermediate layer 14. The resulting laminate is subjected to hot pressing, thereby obtaining the information page 10 of the security document.

Next, laser light is applied to the laser printing layer 15 of the thus-obtained information page 10 from the side of the first external transparent layer 17 to perform necessary printing on the laser printing layer 15.

As described hereinabove, according to this embodiment, no non-uniform external force acts on the IC module 20 upon the hot pressing, and therefore there is no occurrence of deformation of the IC module 20. In particular, as described above, the IC module 20 will not be deformed upon the hot pressing because the intermediate layer 13, the substrate accommodating layer 12a, the IC chip accommodating layer 12b and the additional intermediate layer 14 are all made of polycarbonate. This reduces deformation of the laser printing layer 15 formed over the IC module 20, and can thereby enhance visibility of print formed.

Figure 1:
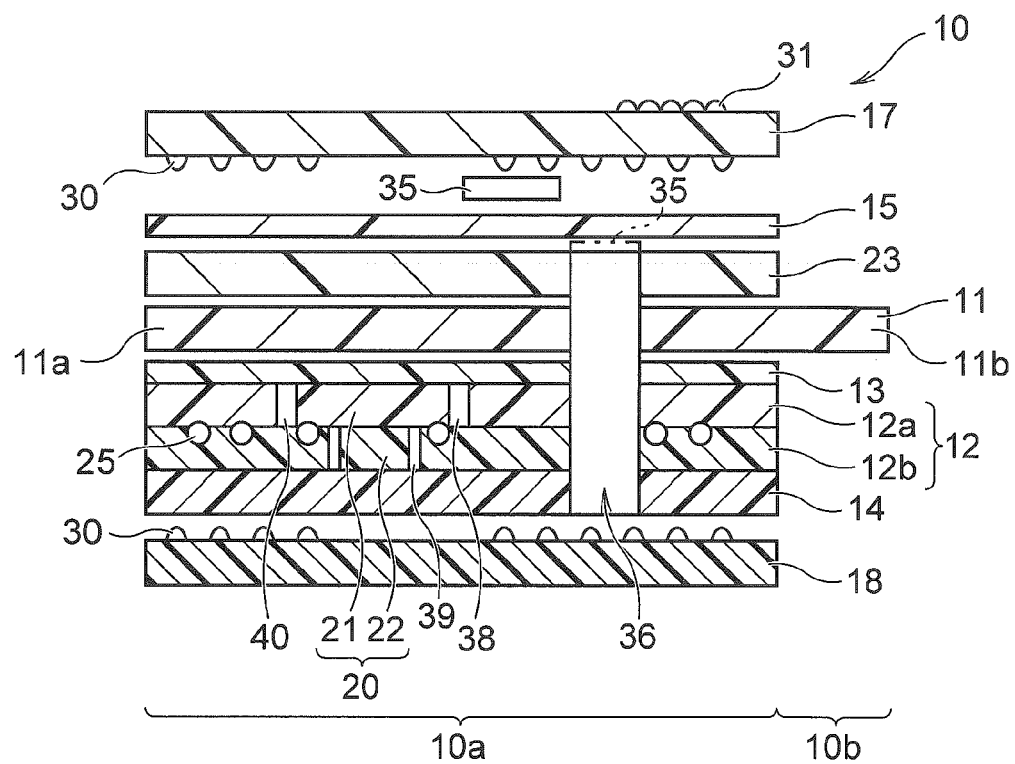
FIG. 1 is a cross-sectional side view of an information page of a security document according to a first embodiment, showing a cross-section in the line-I direction of FIG. 5.
Figure 2:
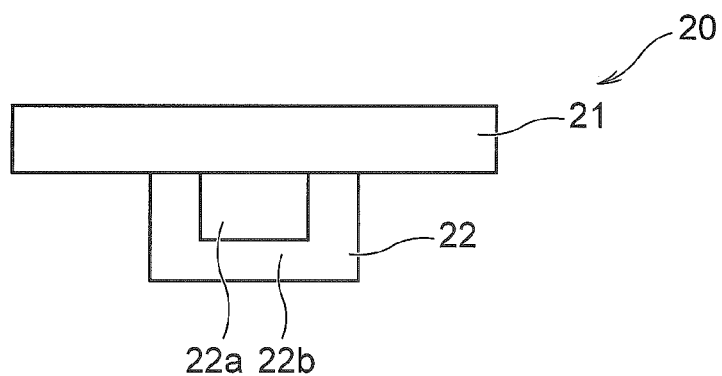
FIG. 2 is a cross-sectional side view of an IC module.

Though in the above-described embodiment the volume hologram 35 is interposed between the laser printing layer 15 and the first external transparent layer 17, the volume hologram 35 may be provided at a position corresponding to the transparent window 36 and between the first white layer 23 and the laser printing layer 15 (see the phantom line of FIG. 1). By providing the volume hologram 35 at such a position corresponding to the transparent window 36, the volume hologram 35 can be viewed from both the front side and the back side of the information page 10.

Second Embodiment

An information page of a security document according to a second embodiment will now be described with reference to FIG. 6.

Figure 6:
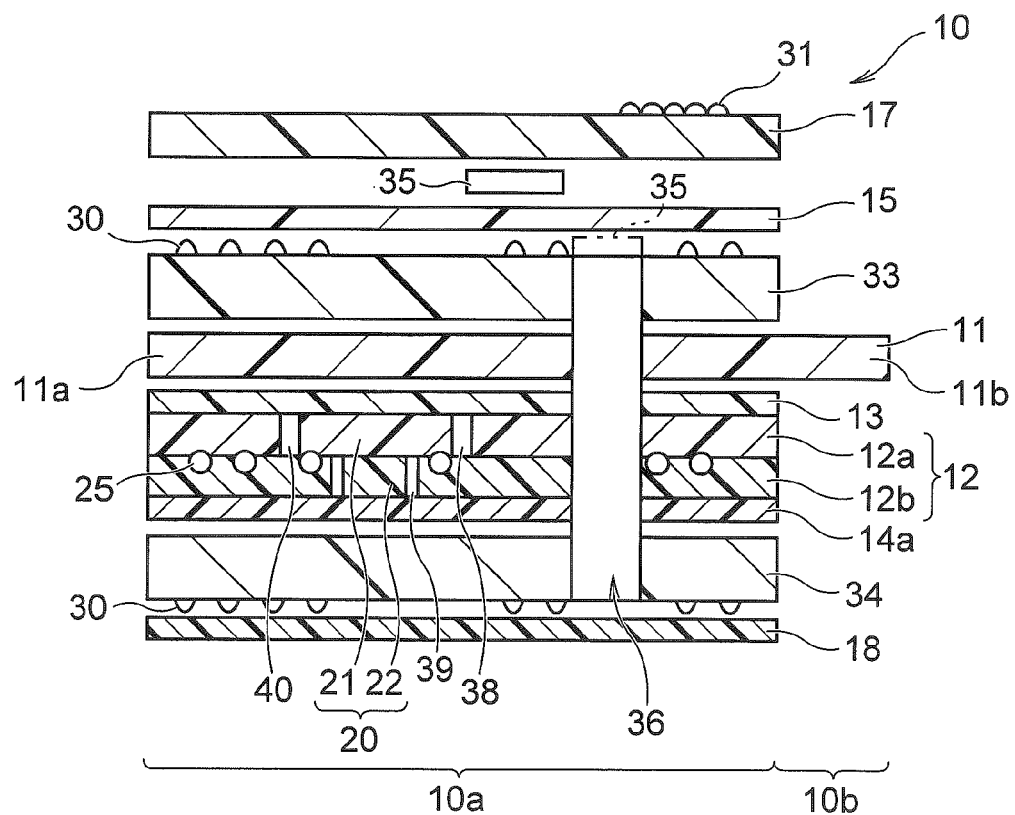
FIG. 6 is a cross-sectional side view of an information page of a security document according to a second embodiment, showing a cross-section in the line-VI direction of FIG. 5.

In the second embodiment shown in FIG. 6, the same symbols are used for the same components or elements as those of the first embodiment shown in FIGS. 1 through 5, and a detailed description thereof is omitted.

As shown in FIG. 6, the information page 10 includes an information portion 10a and a connecting portion 10b, and is attached, in the connecting portion 10b, to a cover 2 and other pages 3 of a security document 1, thus constituting the security document 1.

The information page 10 includes a core layer 11 having flexibility and having a net-like structure, an IC module holding layer 12 provided on the lower surface (one surface) of the core layer 11 via an intermediate layer 13, an IC module 20 held in the IC module holding layer 12, and a laser printing layer 15 provided on the upper surface (the other surface) of the core layer 11 via a first white layer 33.

The core layer 11 having a net-like structure includes a body portion 11a which is bonded to the IC module holding layer 12, the laser printing layer 15, etc. and which, together with them, constitutes the information portion 10a, and a connecting portion 11b constituting the connecting portion 10b which is composed solely of the core layer 11 and in which the information page 10 is attached to the cover 2 and the other pages 3.

The IC module 20 is held in the IC module holding layer 12. In the illustrated case, the IC module holding layer 12 includes a substrate accommodating layer 12a accommodating the substrate 21 of the IC module 20 and housing the substrate 21, and an IC chip body accommodating layer (also referred to as an IC chip accommodating layer) 12b accommodating the IC chip body 22 containing the IC chip 22a, and housing the IC chip body 22.

An antenna 25, connected to the IC chip 22a of the IC module 20, is disposed between the substrate accommodating layer 12a and the IC chip accommodating layer 12b of the IC module holding layer 12. The antenna 25 is made of copper, and provided on a substrate 25a and, together with the substrate 25a, is interposed between the substrate accommodating layer 12a and the IC chip accommodating layer 12b (see FIG. 6).

The IC module holding layer 12 has an IC module housing space 40 in which the IC module 20 is housed and which is composed of an opening 38 formed in the substrate accommodating layer 12a, and an opening 39 formed in the IC chip accommodating layer 12b. The IC module housing space 40 is closed from above and below with the intermediate layer 13 and with an additional intermediate layer 14a provided on the lower surface of the IC module holding layer 12.

The laser printing layer 15 is blackened by irradiation with laser light so that a desired character can be displayed. To this end, the laser printing layer 15 is formed of polycarbonate containing a laser coloring accelerator and, when irradiated with laser light, the laser coloring accelerator has heat energy. The heat energy chars and blackens carbon contained in the polycarbonate in contact with the laser coloring accelerator, resulting in display of a character.

A first external transparent layer 17 is provided on the upper surface of the laser printing layer 15, and a volume hologram 35 is interposed between the laser printing layer 15 and the first external transparent layer 17. The volume hologram 35 can display, for example, a crown in the information page 10 (see FIGS. 4 and 5).

Print 30, such as characters, a pattern, etc., has been formed on the upper surface (outer surface) of the first white layer 33.

A second white layer 34 and a second external transparent layer 18 are provided in this order on the lower surface of the additional intermediate layer 14a. Print 30, such as characters, a pattern, etc., has been formed also on the lower surface (outer surface) of the second white layer 34.

The first white layer 33 functions to enhance visibility of the print 30, which has been formed on the first white layer 33, when viewing the print 30 from the side of the first external transparent layer 17.

In particular, since the print 30, which is light-colored, is provided on the first white layer 33, the print 30 can be easily viewed (checked) from the side of the first external transparent layer 17.

Similarly, light-colored print 30 has been formed on the second white layer 34. Since the print 30 is provided on the second white layer 34, the print 30 can be easily viewed (checked) from the side of the second external transparent layer 18.

There is also provided a transparent window 36 made of a transparent material and penetrating the first white layer 33, the core layer 11, the intermediate layer 13, the IC module holding layer 12, the additional intermediate layer 14a, and the second white layer 34.

The materials of the respective layers constituting the information page 10 will now be described. At the outset, the core layer 11 having a net-like structure is made of PET, nylon, or the like.

The intermediate layer 13, the first external transparent layer 17, the additional intermediate layer 14a and the second external transparent layer 18 are all made of transparent polycarbonate.

The substrate accommodating layer 12a and the IC chip accommodating layer 12b of the IC module holding layer 12, the first white layer 33 and the second white layer 34 are all made of white polycarbonate.

The laser printing layer 15 is made of polycarbonate containing a laser coloring accelerator.

The sizes of the respective layers constituting the information page 10 shown in FIG. 6 will now be described.

The overall thickness of the information page 10 shown in FIG. 6 is, for example, 900 μm. In one example, the thickness of the first external transparent layer 17 is 105 μm, the thickness of the laser printing layer 15 is 50 μm, the thickness of the first white layer 33 is 105 μm, the thickness of the core layer 11 is 130 μm, the thickness of the intermediate layer 13 is 40 μm, the thickness of the substrate accommodating layer 12a is 105 μm, the thickness of the IC chip accommodating layer 12b is 150 μm, the thickness of the additional intermediate layer 14a is 40 μm, the thickness of the second white layer 34 is 105 μm, and the thickness of the second external transparent layer 18 is 50 μm.

A method for producing the thus-constructed information page 10 of the security document will now be described.

First, the intermediate layer 13 and the substrate accommodating layer 12a of the IC module holding layer 12 are laminated together. Subsequently, the substrate 21 of the preformed IC module 20 is inserted into the opening 38 of the substrate accommodating layer 12a.

Subsequently, the antenna 25 is disposed on the substrate accommodating layer 12a, and connected to the IC chip 22a of the IC module 20.

Thereafter, the IC chip accommodating layer 12b is laminated to the substrate accommodating layer 12a. The lamination of the IC chip accommodating layer 12b to the substrate accommodating layer 12a is performed such that the IC chip body 22 of the IC module 20 is housed in the opening 39 of the IC chip accommodating layer 12b. Subsequently, the additional intermediate layer 14a is laminated to the IC chip accommodating layer 12b.

Thereafter, the laminate consisting of the intermediate layer 13, the substrate accommodating layer 12a and the IC chip accommodating layer 12b of the IC module holding layer 12, and the additional intermediate layer 14a is subjected to hot pressing to heat and press the laminate, thereby bonding the layers of the laminate together.

The IC module housing space 40 for housing the IC module 20 is surrounded by the intermediate layer 13, the substrate accommodating layer 12a, the IC chip accommodating layer 12b and the additional intermediate layer 14a which are all made of polycarbonate. Thus, the IC module housing space 40 is surrounded by the polycarbonate materials having approximately the same thermal shrinkage rate. Accordingly, the IC module housing space 40 contracts uniformly with balance during the hot pressing; therefore, no non-uniform external force will be applied by the interior walls of the IC module housing space 40 to the IC module 20 housed in the IC module housing space 40, resulting in no deformation of the IC module 20. This makes it possible to maintain the performance and the appearance of the IC module 20.

Next, the core layer 11 and the first white layer 33 having the print 30 on the outer surface are laminated to the laminate consisting of the intermediate layer 13, the IC module holding layer 12 and the additional intermediate layer 14a, and then the laser printing layer 15 is laminated to the first white layer 33.

Thereafter, the volume hologram 35 is provided on the laser printing layer 15, and then the first external transparent layer 17 is laminated to the laser printing layer 15. Subsequently, the second white layer 34, having the print 30 on the outer surface, and the second external transparent layer 18 are laminated sequentially to the additional intermediate layer 14a. The resulting laminate is subjected to hot pressing, thereby obtaining the information page 10 of the security document.

Next, laser light is applied to the laser printing layer 15 of the thus-obtained information page 10 from the side of the first external transparent layer 17 to perform necessary printing on the laser printing layer 15.

As described hereinabove, according to this embodiment, no non-uniform external force acts on the IC module 20 upon the hot pressing, and therefore there is no occurrence of deformation of the IC module 20. In particular, as described above, the IC module 20 will not be deformed upon the hot pressing because the intermediate layer 13, the substrate accommodating layer 12a, the IC chip accommodating layer 12b and the additional intermediate layer 14a are all made of polycarbonate. This reduces deformation of the laser printing layer 15 formed over the IC module 20, and can thereby enhance visibility of print formed.

Though in the above-described embodiment the volume hologram 35 is interposed between the laser printing layer 15 and the first external transparent layer 17, the volume hologram 35 may be provided at a position corresponding to the transparent window 36 and between the first white layer 33 and the laser printing layer 15 (see the phantom line of FIG. 6). By providing the volume hologram 35 at such a position corresponding to the transparent window 36, the volume hologram 35 can be viewed from both the front side and the back side of the information page 10.

Third Embodiment

An information page of a security document according to a third embodiment will now be described with reference to FIGS. 7 through 8D.

Figure 7:
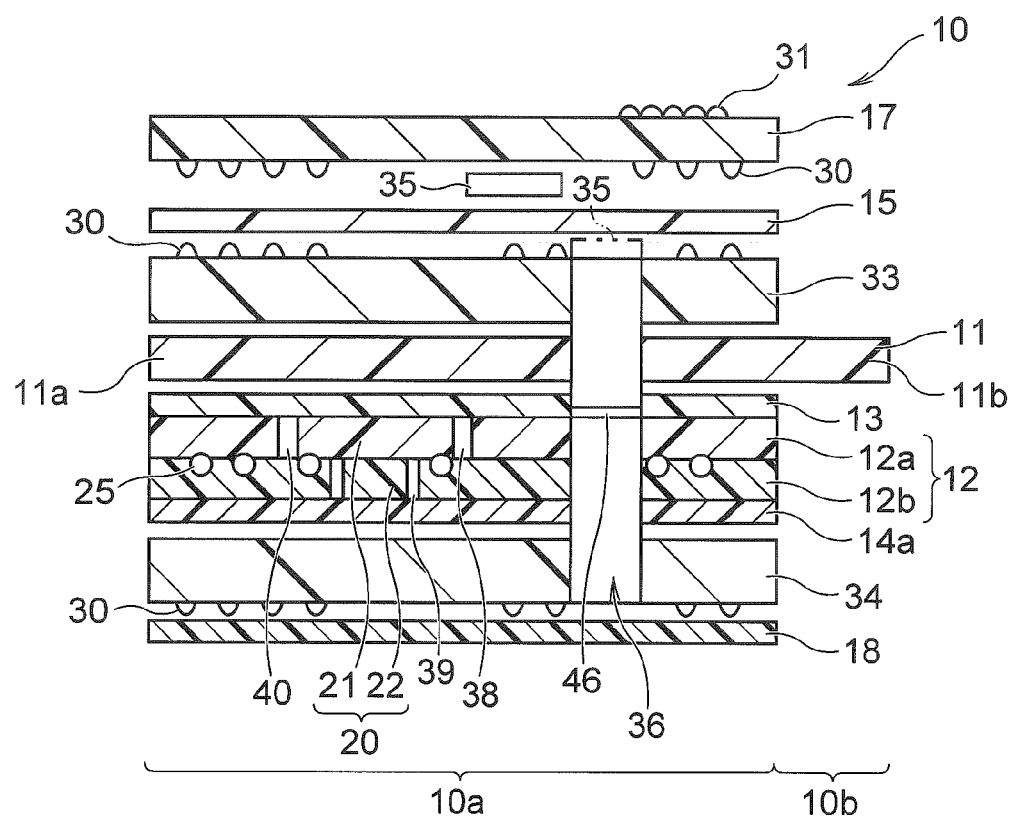
FIG. 7 is a cross-sectional side view of an information page of a security document according to a third embodiment, showing a cross-section in the line-VII direction of FIG. 5.
Figure 8A:
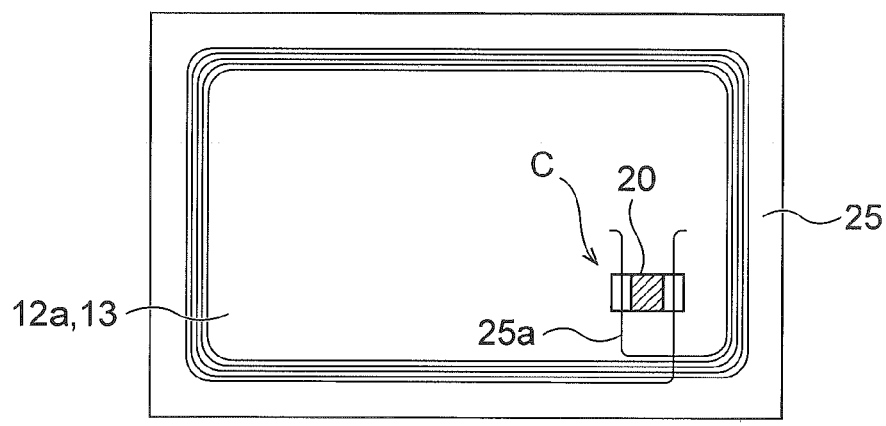
FIG. 8A is a diagram showing an antenna and an IC module, disposed on an intermediate layer and a substrate accommodating layer.
Figure 8B:
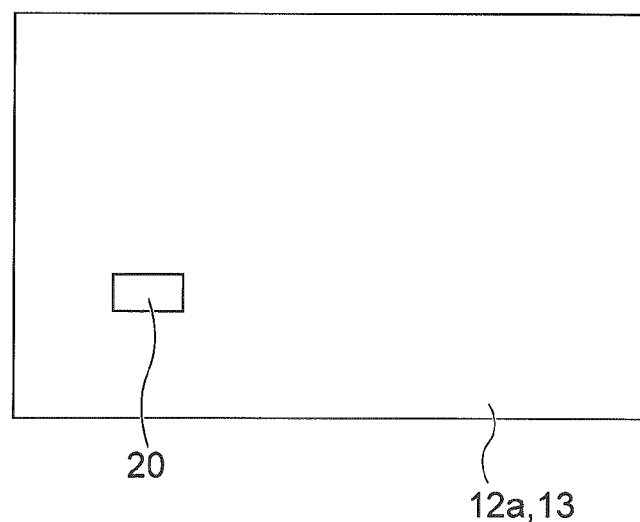
FIG. 8B is a diagram showing the antenna and the IC module when viewed from the back side of the intermediate layer and the substrate accommodating layer.
Figure 8C:
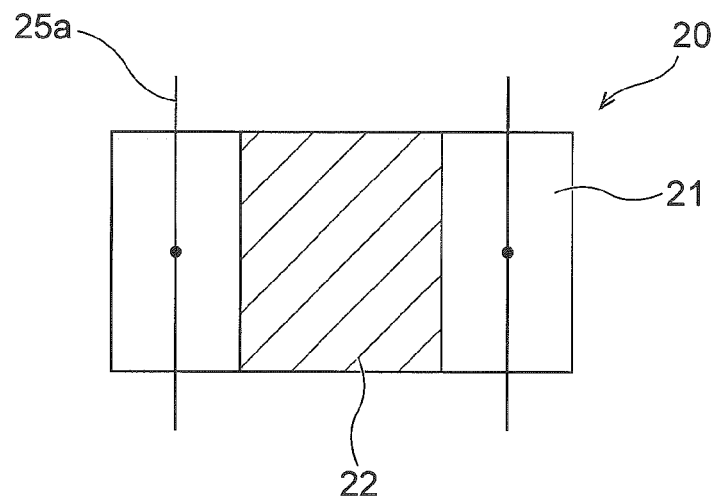
FIG. 8C is an enlarged plan view of the IC module, showing an enlarged view of the portion C of FIG. 8A.
Figure 8D:
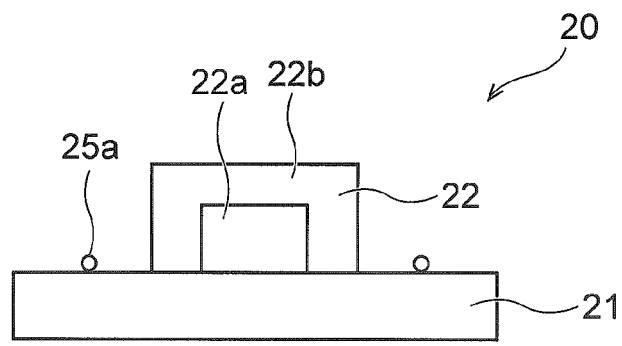
FIG. 8D is an enlarged cross-sectional view of the IC module.

In the third embodiment shown in FIGS. 7 through 8D, the same symbols are used for the same components or elements as those of the first embodiment shown in FIGS. 1 through 5 or the second embodiment shown in FIG. 6, and a detailed description thereof is omitted.

As shown in FIG. 7, the information page 10 includes an information portion 10a and a connecting portion 10b, and is attached, in the connecting portion 10b, to a cover 2 and other pages 3 of a security document 1, thus constituting the security document 1.

The information page 10 includes a core layer 11 having flexibility and having a net-like structure, an IC module holding layer 12 provided on the lower surface (one surface) of the core layer 11 via an intermediate layer 13, an IC module 20 held in the IC module holding layer 12, and a laser printing layer 15 provided on the upper surface (the other surface) of the core layer 11 via a first white layer 33.

The core layer 11 having a net-like structure includes a body portion 11a which is bonded to the IC module holding layer 12, the laser printing layer 15, etc. and which, together with them, constitutes the information portion 10a, and a connecting portion 11b constituting the connecting portion 10b which is composed solely of the core layer 11 and in which the information page 10 is attached to the cover 2 and the other pages 3.

The IC module 20 is held in the IC module holding layer 12. In this embodiment, the IC module holding layer 12 includes a substrate accommodating layer 12a accommodating the substrate 21 of the IC module 20 and housing the substrate 21, and an IC chip body accommodating layer (also referred to as an IC chip accommodating layer) 12b accommodating the IC chip body 22 containing the IC chip 22a, and housing the IC chip body 22.

An antenna 25, connected to the IC chip 22a of the IC module 20, is disposed between the substrate accommodating layer 12a and the IC chip accommodating layer 12b of the IC module holding layer 12. The antenna 25 is made of copper, and provided on a substrate 25a and, together with the substrate 25a, is interposed between the substrate accommodating layer 12a and the IC chip accommodating layer 12b (see FIG. 7).

The IC module holding layer 12 has an IC module housing space 40 in which the IC module 20 is housed and which is composed of an opening 38 formed in the substrate accommodating layer 12a, and an opening 39 formed in the IC chip accommodating layer 12b. The IC module housing space 40 is closed from above and below with the intermediate layer 13 and with an additional intermediate layer 14a provided on the lower surface of the IC module holding layer 12.

The laser printing layer 15 is blackened by irradiation with laser light so that a desired character can be displayed. To this end, the laser printing layer 15 is formed of polycarbonate containing a laser coloring accelerator and, when irradiated with laser light, the laser coloring accelerator has heat energy. The heat energy chars and blackens carbon contained in the polycarbonate in contact with the laser coloring accelerator, resulting in display of a character.

A first external transparent layer 17 is provided on the upper surface of the laser printing layer 15, and a volume hologram 35 is interposed between the laser printing layer 15 and the first external transparent layer 17. The volume hologram 35 can display, for example, a crown in the information page 10 (see FIGS. 4 and 5).

Print 30, such as characters, a pattern, etc., has been formed on the lower surface (inner surface) of the first external transparent layer 17 and on the upper surface (outer surface) of the first white layer 33.

A second white layer 34 and a second external transparent layer 18 are provided in this order on the lower surface of the additional intermediate layer 14a. Print 30, such as characters, a pattern, etc., has been formed also on the lower surface (outer surface) of the second white layer 34.

There is also provided a transparent window 36 made of a transparent material and penetrating the first white layer 33, the core layer 11, the intermediate layer 13, the IC module holding layer 12, the additional intermediate layer 14a, and the second white layer 34.

The materials of the respective layers constituting the information page 10 will now be described. At the outset, the core layer 11 having a net-like structure is made of PET, nylon, or the like.

The intermediate layer 13, the first external transparent layer 17, the additional intermediate layer 14a and the second external transparent layer 18 are all made of transparent polycarbonate.

The substrate accommodating layer 12a and the IC chip accommodating layer 12b of the IC module holding layer 12, the first white layer 33 and the second white layer 34 are all made of white polycarbonate.

The laser printing layer 15 is made of polycarbonate containing a laser coloring accelerator.

Of the above layers, the first white layer 33 functions to enhance visibility of the print 30, which has been formed on the lower surface of the first external transparent layer 17, when viewing the print 30 from the side of the first external transparent layer 17.

In particular, with the first white layer 33 provided under the first external transparent layer 17, the first white layer 33 serves as a background and enables the print 30, which is colored dark and formed on the lower surface of the first external transparent layer 17, to be easily viewed (checked) from the side of the first external transparent layer 17.

Light-colored print 30 has been formed on the first white layer 33. Since the print 30 is provided on the first white layer 33, the print 30 can be easily viewed (checked) from the side of the first external transparent layer 17.

Further, light-colored print 30 has been formed on the second white layer 34. Since the print 30 is provided on the second white layer 34, the print 30 can be easily viewed (checked) from the side of the second external transparent layer 18.

The transparent window 36, penetrating the first white layer 33, the core layer 11, the intermediate layer 13, the IC module holding layer 12, the additional intermediate layer 14a, and the second white layer 34, will now be described.

The transparent window 36 can be set up by sequentially laminating the first white layer 33, the core layer 11, the intermediate layer 13, the IC module holding layer 12 incorporating the IC module 20, the additional intermediate layer 14a, and the second white layer 34, forming a through-hole in the resulting laminate, and then inserting the transparent window 36 of polycarbonate into the through-hole.

The transparent window 36 of polycarbonate functions to prevent counterfeiting based on the presence/absence of the transparent window 36. The transparent window 36 may be formed of half portions 36a, 36a, and an image film 46 having a particular image and interposed between the portions 36a, 36a. In this case, the transparent window 36 having the image film 46 is inserted into the through-hole.

The information page 10 contains the volume hologram 35 (see FIG. 7), including one which displays a crown, provided between the laser printing layer 15 and the first external transparent layer 17. The volume hologram 35 can be obtained by transferring a transfer sheet, containing the volume hologram 35, to the upper surface of the laser printing layer 15. Subsequently, the first external transparent layer 17 is laminated to the laser printing layer 15 to which the volume hologram 35 has been transferred.

It is also possible to interpose the volume hologram 35 between the laser printing layer 15 and the first white layer 33 by first transferring a transfer sheet, containing the volume hologram 35, to the lower surface of the laser printing layer 15 to thereby provide the volume hologram 35 on the laser printing layer 15, and then laminating the first white layer 33 to the laser printing layer 15.

Figure 3:
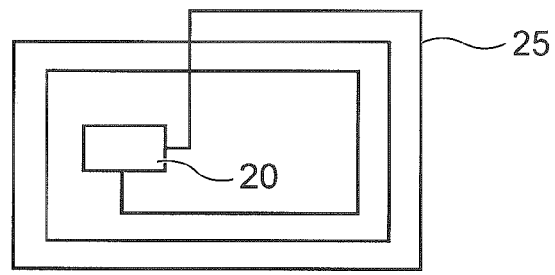
FIG. 3 is a diagram showing a positional relationship between an antenna and the IC module.

In the above-described embodiments, the antenna 25 is connected to the IC module 20 (see FIG. 3). The antenna 25, connected to the IC module 20, may be disposed as shown in FIGS. 8A through 8D.

FIG. 8A is a diagram showing the antenna 25 and the IC module 20, disposed on the intermediate layer 13 and the substrate accommodating layer 12a, and FIG. 8B is a diagram showing the antenna 25 and the IC module 20 when viewed from the side of the intermediate layer 13 and the substrate accommodating layer 12a.

As shown in FIGS. 8A through 8D, the antenna 25 is disposed in a winding shape on a peripheral portion of the intermediate layer 13 and the substrate accommodating layer 12a, and a part 25a of the antenna 25 extends inward from the winding and is connected to the IC module 20 provided inside the winding of the antenna 25.

Referring to FIGS. 8C and 8D, the IC module 20 includes a substrate 21, and an IC chip 22a provided on the substrate 21 and covered with a sealing resin 22b. The IC chip 22a and the sealing resin 22b constitute an IC chip body 22.

While the core layer 11 is disposed over the intermediate layer 13 in the above-described embodiments (see FIGS. 1, 6 and 7), the core layer 11 may be disposed under the additional intermediate layer 14 (see FIG. 1) or under the additional intermediate layer 14a (see FIGS. 6 and 7).

DESCRIPTION OF THE SYMBOLS 1 security document
10 information page
10a information portion
10b connecting portion
11 core layer
11a body portion
11b connecting portion
12 IC module holding layer
12a substrate accommodating layer
12b IC chip accommodating layer
13 intermediate layer
14 additional intermediate layer
15 laser printing layer
17 first external transparent layer
18 second external transparent layer
20 IC module
21 substrate
22 IC chip body
22a IC chip
22b sealing resin
23 first white layer
25 antenna
30 print
31 lenticular lens
33 first white layer
34 second white layer
35 volume hologram
36 transparent window
40 IC module housing space

The invention claimed is:

1. An information page of a security document, comprising:
a core layer having a net-like structure formed of a fabric of crossing yarns each composed of a plurality of single fibers and the core layer having a body portion and a connecting portion;
the body portion of the core layer is bonded directly on one surface of a polycarbonate intermediate layer, and a polycarbonate IC module holding layer is bonded directly on the other surface of the intermediate layer; and
an IC module embedded in the IC module holding layer, the IC module including a substrate and an IC chip provided on the substrate, wherein the IC module is directly connected on a first side to the polycarbonate intermediate layer and directly connected on a second side to a second polycarbonate intermediate layer, wherein the connecting portion of the core layer protrudes from the page such that it does not touch any other layer of the information page and is the only portion of the information page that is configured to be attached to the security document;

and wherein an opening is provided in at least the core layer, polycarbonate intermediate layer, polycarbonate IC holding layer, and second polycarbonate intermediate layer, and wherein a volume hologram is provided above said opening such that the volume hologram is viewable through the opening from opposing sides of the information page.

2. The information page of a security document according to claim 1, further comprising a laser printing layer provided on a second surface of the body portion of the core layer.

3. The information page of a security document according to claim 2, further comprising a first external transparent layer provided on the laser printing layer and having print formed on its inner surface.

4. The information page of a security document according to claim 3, further comprising a second external transparent layer provided on the IC module holding layer and having print formed on its inner surface.

5. The information page of a security document according to claim 2, wherein the IC module holding layer has a multi-layer construction including a substrate accommodating layer accommodating the substrate, and an IC chip accommodating layer accommodating the IC chip, and wherein an antenna, connected to the IC chip of the IC module, is interposed between the substrate accommodating layer and the IC chip accommodating layer.

6. The information page of a security document according to claim 2, wherein a hologram is interposed between any two layers of the information page.

7. The information page of a security document according to claim 2, further comprising a first white layer provided between the core layer and the laser printing layer and having print formed on its outer surface.

8. The information page of a security document according to claim 7, further comprising a first external transparent layer provided on the laser printing layer.

9. The information page of a security document according to claim 2, further comprising a transparent window made of a transparent material and penetrating at least the core layer and the IC module holding layer.

10. A security document incorporating the information page according to claim 2.

11. The information page of a security document according to claim 1, wherein the IC module holding layer has a multi-layer construction including a substrate accommodating layer accommodating the substrate, and an IC chip accommodating layer accommodating the IC chip, and wherein an antenna, connected to the IC chip of the IC module, is interposed between the substrate accommodating layer and the IC chip accommodating layer.

12. The information page of a security document according to claim 11, further comprising a first external transparent layer provided on the laser printing layer and having print formed on its inner surface.

13. The information page of a security document according to claim 12, further comprising a second external transparent layer provided on the IC module holding layer and having print formed on its inner surface.

14. The information page of a security document according to claim 1, wherein a hologram is interposed between any two layers of the information page.

15. The information page of a security document according to claim 1, further comprising a first white layer provided between the core layer and the laser printing layer and having print formed on its outer surface.

16. The information page of a security document according to claim 15, further comprising a first external transparent layer provided on the laser printing layer.

17. The information page of a security document according to claim 16, further comprising a second white layer provided on the IC module holding layer and having print formed on its outer surface.

18. The information page of a security document according to claim 15, further comprising a second white layer provided on the IC module holding layer and having print formed on its outer surface.

19. The information page of a security document according to claim 1, further comprising a transparent window made of a transparent material and penetrating at least the core layer and the IC module holding layer.

20. A security document incorporating the information page according to claim 1.

* * * * *